United States Patent [19]

Alexander

[11] Patent Number: 4,790,715
[45] Date of Patent: Dec. 13, 1988

[54] DUMP TRUCK ACCESSORY

[76] Inventor: Richard E. Alexander, 501 Okoboji Ave., Milford, Iowa 51351

[21] Appl. No.: 123,127

[22] Filed: Nov. 20, 1987

Related U.S. Application Data

[63] Continuation-in-part of Ser. No. 723,315, Apr. 15, 1985, abandoned.

[51] Int. Cl.$^4$ .............................................. B60P 1/36
[52] U.S. Cl. .................................... 414/489; 414/528
[58] Field of Search ............... 414/489, 528, 519, 491, 414/332, 349-351; 298/7; 198/840

[56] References Cited

U.S. PATENT DOCUMENTS

| | | | |
|---|---|---|---|
| 207,626 | 9/1878 | Sargent | 198/840 X |
| 2,484,689 | 10/1949 | Davis | 414/489 |
| 3,010,727 | 11/1961 | Swenson et al. | 414/528 X |
| 3,122,251 | 2/1964 | Gardipee | 414/489 |
| 3,125,345 | 3/1964 | Ellis | 414/489 X |
| 3,300,068 | 1/1967 | Tarrant, Sr. | 414/528 |
| 4,015,484 | 4/1977 | Taylor | 198/840 X |
| 4,261,520 | 4/1981 | Hetrick | 414/489 X |
| 4,377,365 | 3/1983 | Layh | 414/528 X |

FOREIGN PATENT DOCUMENTS 3034030  5/1982  Fed. Rep. of Germany ...... 414/489

Primary Examiner—Robert J. Spar
Assistant Examiner—David A. Bucci
Attorney, Agent, or Firm—Zarley McKee, Thomte, Voorhees & Sease

[57] ABSTRACT

A dump truck accessory is attached to the rear of a dump truck and serves to accurately deposit asphalt, sand, gravel or other material being hauled therein is provided. The preferred embodiment consists of a lateral conveyor belt combined with an end gate, which allows the operator to deposit the desired amount of material in a pile at the side of the truck, when the dump truck is stationary or in an elongated strip when the dump truck is moving. A uniquely designed leveling rod connects the accessory to the dump truck frame, and serves to maintain the conveyor belt in a functional attitude.

6 Claims, 2 Drawing Sheets

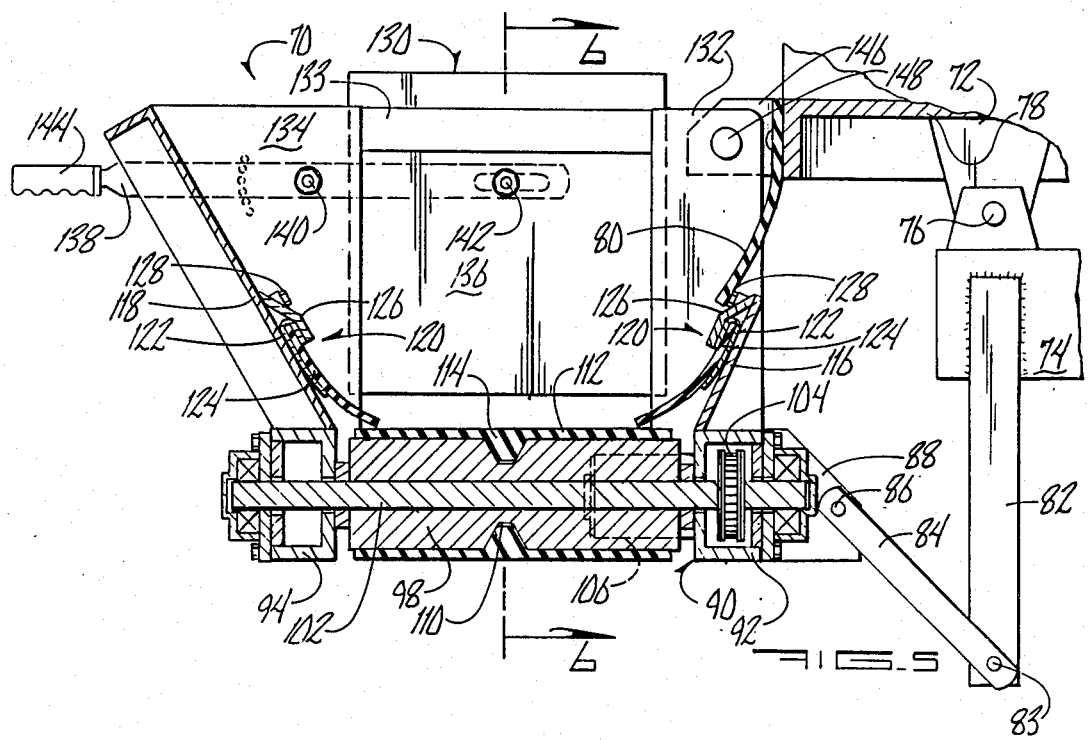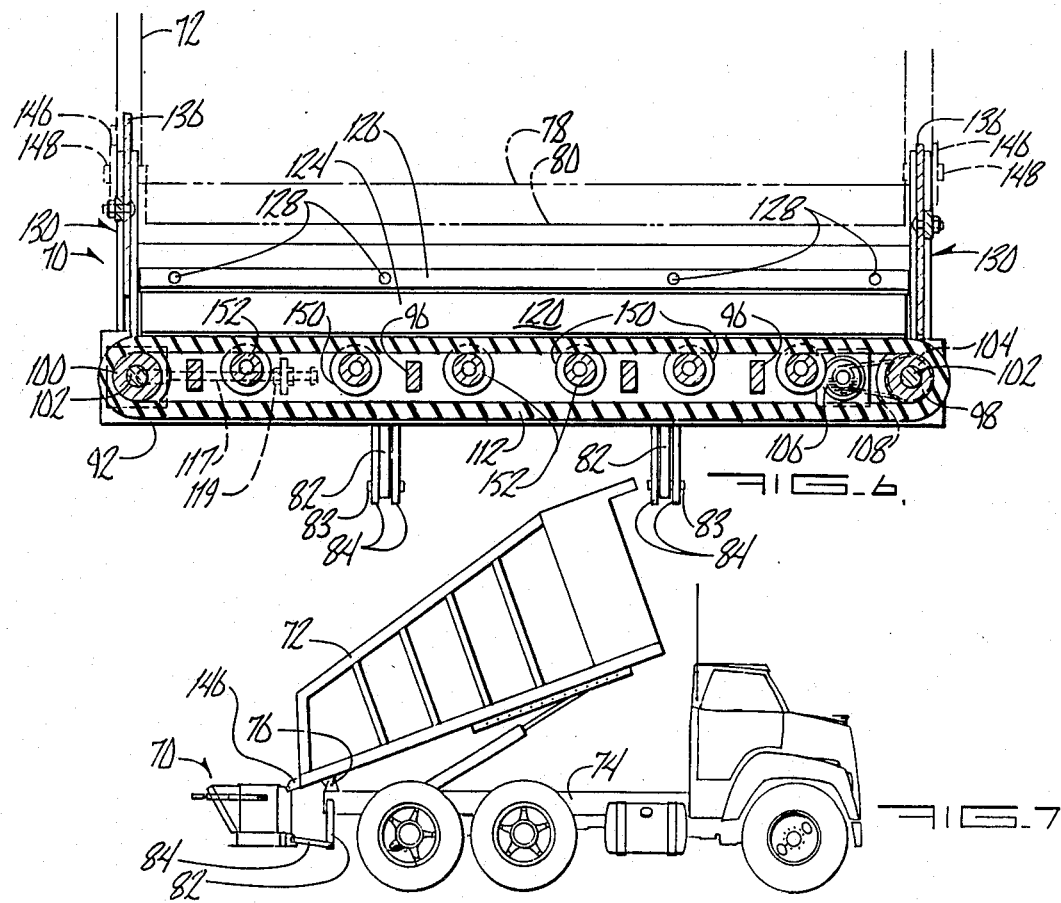

DUMP TRUCK ACCESSORY

BACKGROUND OF THE INVENTION

This is a continuation-in-part of co-pending application Ser. No. 723,315, filed Apr. 15, 1985, now abandoned.

The present invention relates generally to devices for spreading asphalt, sand, gravel and the like and more particularly to an accessory for mounting on the rear of a dump truck that is capable of depositing a desired amount of material at a point location or a row along side the truck by means of a variable speed conveyor belt and gate.

Those concerned with road construction and road repair have long been acquainted with the problems encountered when filling trenches, potholes and the like and when repairing shoulders or curbs. A particular problem is the amount of manpower and time required in standard road construction, maintenance and repair. Typically, when maintaining or repairing an asphalt road, at least one worker will stand in the back of the truck and shovel the asphalt over the side to one or more workers waiting below who shovel or rake the material into the pothole or onto the shoulder in preparation for the rolling machine to smooth and complete the repair. Similarly, when filling in trenches in a roadway, the sand, gravel or other fill is shoveled over the side or dumped into a pile to the rear and then raked or shoveled into the trench.

In the past, devices have been used which control the flow rate of the material out of the back of a dump truck in order to avoid excessive piling in any one location. Also, accessories have been used which receive the material at the end of the truck at a level lower than the dump box for direct shoveling to the desired area. Although these devices have been an improvement over the use of solely a dump truck and workers, they still require a substantial amount of manpower to properly place the material and complete a construction, maintenance, or repair job.

The majority of the cost of roadwork is borne by municipalities, counties, states or the federal government, and many highways, especially secondary roads are in need of repair. With the high demand on the various road funds and the already high gasoline tax and licensing fees, there is a need for more time and cost efficient methods of building, repairing, and maintaining the nation's roads.

SUMMARY OF THE INVENTION

Accordingly, the present invention provides a dump truck accessory used for road construction, maintenance and repair that serves to accurately place a desired quantity of road building material with a minimal expenditure of manpower and time.

The accessory of the present invention includes an accessory frame which includes forward and rearward channel frames spaced apart and parallel to one another and a plurality of spacer frames extending between the channel frames. First and second conveyor rollers are mounted at opposite ends of the channel frames in spaced apart parallel relation to one another. The rollers are rotatably mounted for rotation about roller axis extending in the direction of travel of the vehicle. Each of the rollers have an outer cylindrical surface and an annular groove in that cylindrical surface. An endless conveyor belt is trained around the conveyor rollers and includes an endless rib on its inner diameter which is trained around the conveyor rollers and which protrudes within the annular grooves of the conveyor rollers.

A reversible motor or other power device is connected to one of the conveyor rollers for driving it and the conveyor belt. The motor is reversible so as to reverse the direction of rotation of the conveyor belt, and the frictional engagement of the V-shaped rib of the conveyor belt in the V-shaped groove of the rollers permits this reversing to be accomplished.

The other conveyor roller is movably mounted to the accessory frame for adjustable movement toward and away from the first conveyor roller so as to adjust the tension in the conveyor belt. A lead screw adjustment is attached to the movable conveyor roller for permitting selective adjustment of the tension in the conveyor roller.

The accessory includes a forward wall attached to the channel frame and extending upwardly and forwardly therefrom, and a rearward wall attached to the channel frame and extending upwardly and rearwardly therefrom. At opposite ends of the forward and rearward walls are a pair of end gates which span the distance between the forward and rear walls and which are movable upwardly and downwardly. Lever handles or other means are used for moving the gates upwardly and downwardly selectively.

An elongated front flashing member is attached to the front wall and extends downwardly where its lower edge rests on the conveyor belt on a line spaced inwardly from the forward edge of the conveyor belt. An elongated rear flashing member having an upper edge attached to the rearward wall of the accessory and has a lower edge resting on the conveyor belt on a line spaced inwardly from the rearward edge of the conveyor belt.

The accessory is pivotally connected to the truck box by means of a hinge which connects the upper end of the accessory to the rear end of the truck box for pivotal movement about a horizontal accessory axis located rearwardly from the pivotal axis of the dump truck box. A leveling link has its forward end pivotally connected to the truck frame for pivotal movement about a first link axis located below the truck box axis. The rearward end of the link is pivotally connected to the accessory frame for pivotal movement about a second link axis located below the accessory axis, whereby the leveling link will maintain the accessory frame in a substantially constant level orientation in response to pivotal movement of the truck box between its lowered and elevated positions.

An object of the present invention is to provide a dump truck accessory that facilitates the accurate placement of road building material when constructing, repairing, or maintaining road surfaces.

Another object is to provide a device for road construction, maintenance and repair that saves labor, time and expense.

A further object of the invention is to provide a dump truck accessory that is adaptable to various dump trucks and is easily attached or removed as needed.

Still another object is to provide a dump truck accessory that minimizes waste of road building material.

Yet another object is to provide an apparatus for depositing various road building materials that is versatile and durable.

A further object of the present invention is the provision of a conveyor belt which has a V-shaped rib fitted within V-shaped annular grooves in the conveyor rollers and which also includes means for reversing the direction of the conveyor belt so that materials may be deposited from either end of the conveyor belt.

Other objects, advantages and novel features of the present invention will become apparent from the following detailed description of the invention when considered in conjunction with the accompanying drawings.

BRIEF DESCRIPTION OF THE DRAWINGS

FIG. 5 is a view similar to FIG. 3, but showing a modified form of the invention.

FIG. 6 is a sectional view taken along line 6—6 of FIG. 5.

FIG. 7 is a side elevational view of a dump truck having the accessory of the present invention mounted thereon.

DESCRIPTION OF THE PREFERRED EMBODIMENT

Figure 1:
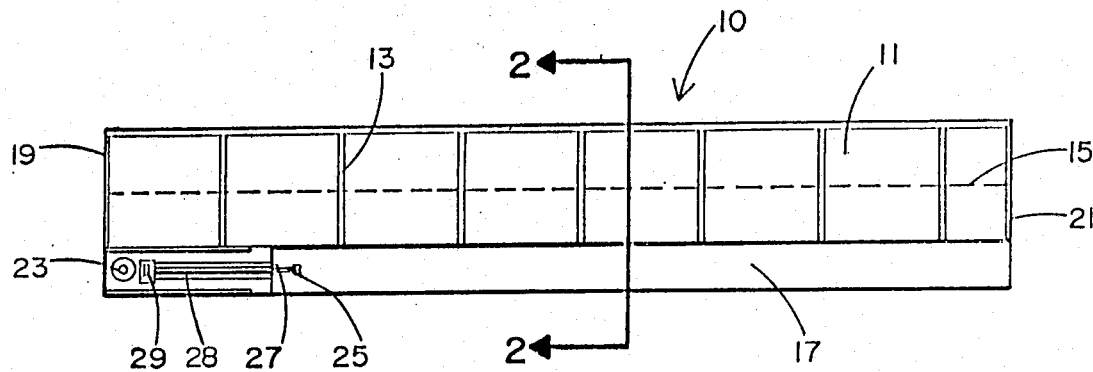
FIG. 1 is a side view of the dump truck accessory of the present invention, showing the side away from the truck.

Referring now to the drawings wherein like reference numerals designate identical or corresponding parts throughout the several views, FIG. 1 shows the dump truck accessory of the present invention indicated generally at 10. The main structure of the dump truck accessory 10 includes a rear wall 11 rigidly attached on top of a rear channel iron 17, a forward wall 15 rigidly attached on top of a forward channel iron 41, a conveyor belt 35 laterally mounted between the channel irons 17 and 41, an end plate 19, and an end gate 21. The main elements as set out above cooperate to form a trough for lateral attachment to the rear of a dump truck box 51. By using the conveyor belt 35 located in the bottom of the trough in conjunction with the gate 21 located on one end of the trough, the dump truck accessory 10 functions to accurately deposit a desired amount of material during road construction, maintenance, or repair.

Support ribs 13 strengthen the rear wall 11 and also serve to make a more solid connection between the rear wall 11 and the rear channel iron 17. Similarly, support ribs 34 strengthen the forward wall 15. The channel irons 17 and 41 are spaced slightly farther apart than the width of the conveyor belt 35 and are held in place by welding at least two spacers (not shown) between them.

The conveyor belt 35 rides on rollers 37 rotatably mounted between channel irons 17 and 41. A drive roller 23 powers the conveyor belt 35 through use of the truck's hydraulic system as well known in the art. It is understood that alternate power systems such as electric, internal combustion or the like could also be used to power the conveyor belt. The drive roller 23 is adjustably mounted for changing the tension in the conveyor belt 35 by turning adjusting bolt 25. A first adjusting nut 27 is immovably attached to the rear channel iron 17 and guides adjusting bolt 25 towards a second adjusting nut 29. When adjusting bolt 25 is tightened, it pushes the drive roller 23 outward by exerting a lateral force outward against a collar (not shown) slidably mounted in groove 28. To prevent binding, the same structure is used in the forward channel iron and, in use, each adjusting bolt 25 should be tightened to the same relative position. It is understood that conveyor belts are well known in the art and that various types and configurations of conveyor belts can be laterally mounted between the channel irons 17 and 41 without detracting from the spirit of the invention.

Figure 2:
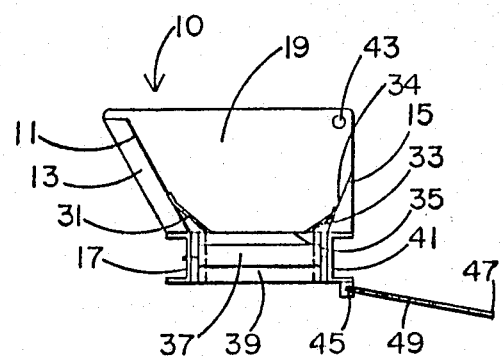
FIG. 2 is a section view along line 2—2 showing the conveyor belt assembly and trough in the interior of the dump truck accessory.

As can best be seen in FIG. 2, to prevent the material being deposited from spilling over the sides of the conveyor belt 35, and causing damage, flashing 31 and 33 is attached to the rear wall 11 and forward wall 15 respectively. Rear wall flashing 31 extends the full lateral distance of rear wall 11 and similarly, forward wall flashing 33 extends the full lateral distance of forward wall 15. The flashing 31 and 33 is applied by bolting or riveting the top edge to the rear and forward walls 11 and 15 at various intervals as well known in the art. The lower edge of the flashing 31 and 33 freely rests on the conveyor belt 35 along a line that is a sufficient distance in from the edges of the conveyor belt 35 to prevent the flashing 31 and 33 from sliding off of the edge of the belt 35 when pressure is applied to it by the material being deposited. In the preferred embodiment the flashing is made from a stiff but flexible rubber, but it is understood that various other resilient materials such as nylon, plastic or certain metals would be equally as functional.

Figure 3:
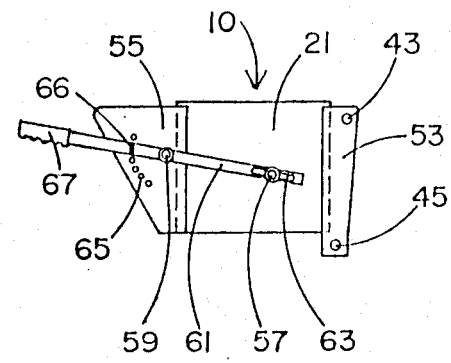
FIG. 3 is an end view showing the gate mechanism of the present invention.

As can best be seen in FIG. 3, the gate 21 is raised and lowered by gripping a handle 67 mounted on a gate lever 61 and then manually raising or lowering the gate lever 61. The gate lever 61 pivots about a fulcrum pin 59 that is affixed to a rear gate guide 55 and when the handle 67 is pushed downward a lever slot 63 on the other end of the gate lever 61 is raised. The lever slot cooperates with a gate bolt 57 affixed near the center of the gate 21 to raise and lower the gate 21 between gate guides 55 and 53. When the gate 21 is at the desired level, spring pin 66 is locked into the corresponding locking aperture 65 until such time as the operator desires to reset gate 21. By coordinating the operation of the gate 21 with the speed of the conveyor belt 35, the operator can control the quantity, location and flow rate of material being deposited from the dump truck box 51.

Although the drawings disclose a gate 21 manually operated by a lever arm 61, it is understood that other means for opening and closing gates including hydraulics or electric powered gates as well known in the art would not detract from the spirit of the invention. Additionally, although the gate 21 of FIG. 1 is shown to be on the right hand or passenger side of the dump truck accessory 10, it can easily be built into the left or driver side of the accessory 10 if desired.

In order for the conveyor belt 35 to effectively function, it must be kept generally level in relation to the ground. As illustrated in the simplified view of FIG. 4, the dump truck accessory 10 is pivotally attached to the dump truck box 51 at upper pivot point 43 on both ends of the dump truck accessory 10. A leveling rod 49 is then pivotally attached on one end to a fixed point on the truck frame at frame connecting point 47 and pivotally attached on the other end to a lower connecting point 45 on the bottom of the dump truck accessory 10.

In the preferred embodiment the leveling rod 49 has hooked ends inserted through apertures located at connecting points 45 and 47, but it is understood that other pivotal connectors such as hinges or ball and socket joints would be equally as functional.

Figure 4:
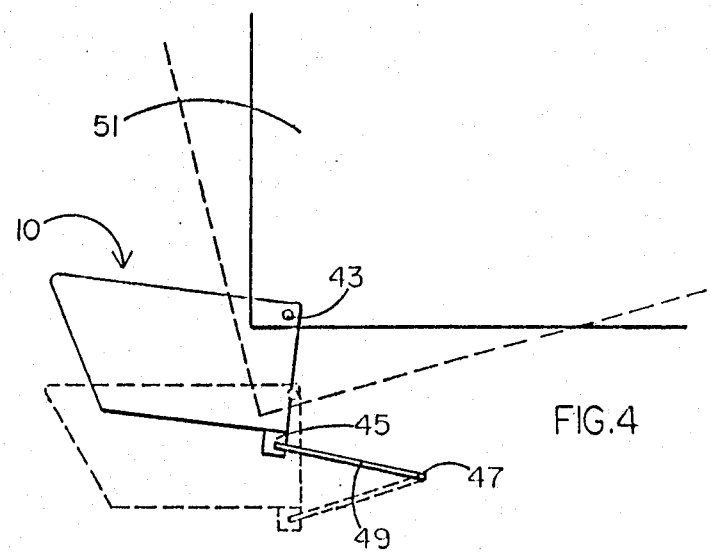
FIG. 4 is a simplified view of the accessory mounted on a dump truck box showing the manner by which the conveyor belt is maintained in a level attitude.

In operation, as the dump truck box 51 is raised, upper pivot point 43 is lowered and moves slightly forward. At the same time, leveling rod 49 pivots around the fixed frame connecting point 47 from a slightly forward sloping attitude to a rearward sloping attitude. As shown in FIG. 4, the fixed point 47 geometrically cooperates with the fixed length of rod 49 and the fixed distance between points 43 and 45 to move point 45 down and slightly forward as the truck box 51 is raised, thus maintaining the dump truck accessory 10 in a generally level attitude.

For optimum leveling performance, upper pivot point 43 is located near the bottom of truck box 51 and slightly forward of the lower rear corner thereof. The leveling rod 49 should be approximately the same length as the distance between points 43 and 45 and the rod 49 should be in a slightly forward sloping attitude when the truck box 52 is in a level position. In the preferred embodiment two leveling rods 49 are used, located at approximately the one third points on the accessory 10, thereby corresponding to most truck frames, but one leveling rod would be sufficient so long as it is of sufficient strength to avoid failure by compression or buckling as the dump truck box 51 is raised.

For use with most trucks, rear lights (not shown) are mounted on rear channel iron 17 and functionally connected to the truck's electric system as well known in the art. The rear lights serve to replace the dump truck's lights which may be covered by the dump truck accessory 10.

Referring to FIGS. 5-7, a modified form of the invention is shown and is generally designated by the numeral 70. Accessory 70 is shown attached to the rearward box 72 of a truck having a truck frame 74. Truck box 72 is pivoted to truck frame 74 for pivotal movement about horizontal axis 76. Bolted or otherwise attached to the bed 78 of box 72, is a flap extension 80 which is flexible and is preferably made of rubber or the like. Flap 80 permits the contents of box 72 to be deposited within accessory 70 with a minimum of spillage to the ground.

Extending downwardly from the lower end of truck frame 74 is a fixed link 82 which is vertical and which is welded or otherwise fixedly attached to truck frame 74. The lower end of link 82 is pivotally connected to a pair of leveling links 84. The upper end of leveling link 84 is pivotally connected at 86 to an ear flange 88. As can be seen in FIG. 6, there are two fixed links 82 each of which is pivotally connected to a pair of leveling links 84. There are two spaced apart ear flanges 88 rigidly connected to an accessory frame 90. Accessory frame 90 comprises two side frame members 92, 94 which are interconnected by a plurality of cross-frame members 96.

Rotatably mounted at the opposite ends of accessory frame 90 are a drive roller 98 and a tensioning roller 100, both of which are pivotally mounted between the side frame members 92, 94 by means of a roller axle 102. As can be seen in FIG. 5, axle 102 of drive roller 98 includes a gear 104 thereon. Also attached to side frame member 92 is a motor 106 which has a gear (not shown) in registered alignment with gear 104. A drive chain 108 (FIG. 6) is trained around the gear from motor 106 and the gear 104 from drive roller 98. Motor 106 may be hydraulic or electric as desired, but preferably is a reversible motor so that the direction of rotation of drive roller 98 can be reversed as desired.

Drive roller 98 includes at its approximate center a V-shaped annular groove 110. Tensioning roller 100 includes a similar V-shaped annular groove. A conveyor belt 112 is trained around rollers 98, 100 and includes on its internal surface a V-shaped rib 114 which is frictionally fitted within V-shaped groove 110 of rollers 98, 100. This V-shaped groove and rib arrangement permits the conveyor belt to be frictionally driven by the drive roller 98, and also permits the conveyor belt to be reversed merely by reversing the motor 106.

Tensioning roller 100 is movable toward and away from drive roller 98 in the same manner as previously described for roller 23 in the device shown in FIG. 1. A lead screw 117 is attached to the axle 102 and is threaded within threaded bracket 119 so that rotation of lead screw 117 causes longitudinal movement of tensioning roller 100 toward and away from drive roller 98, thereby permitting the tension in conveyor belt 112 to be adjusted.

Extending upwardly from side frame member 92 is a front wall 116 which is inclined upwardly and forwardly from frame member 92. Similarly, an inclined rear wall 118 extends upwardly and rearwardly from side frame member 92. Attached to both front wall 116 and rear wall 118 are a pair of flashing assemblies generally designated by the numeral 120. Each flashing assembly 120 comprises a U-shaped channel 122 which surrounds the upper edge of a rubber flashing member 124. Flashing member 124 may be rubber or other flexible material. A retaining strip 126 is bolted to front wall 116 by bolts 128 and frictionally engages U-shaped member 122 so as to hold U-shaped member 122 and flashing member 124 in fixed attachment to front wall 116. As can be seen in FIG. 6, the lower ends of flashing member 124 rest upon and are deflected slightly against the upper surface of conveyor belt 112 along a line located inwardly from the edge of belt 112.

At the opposite ends of accessory 70 are a pair of identical gate assemblies 130 which comprise a forward gate frame member 132 and a rearward gate frame member 134 which are interconnected by a horizontal gate frame member 133. Slidably mounted for vertical sliding movement between gate frame members 132, 134 is a gate 136. A gate raising lever 138 is pivoted at 140 to rear gate frame 134 and is also pivoted at 142 to gate 136. Thus, by depressing the handle 144, it is possible to raise gate 136.

Forward gate frame member 132 is pivotally connected to an ear flange 146 for pivotal movement about axis 148. Ear flange 146 is rigidly connected to truck box 72. Thus, pivot points 148, 76, 83 and 86 provide four pivot points for suspending accessory 70 at the rear of truck box 72. As truck box 72 is tilted so that its rearward end pivots downwardly with respect to axis 76, the leveling link 84 pivots in a counterclockwise direction as viewed in FIG. 6, and pivot point 85 moves downwardly and rearwardly with respect to truck frame 74. This causes the accessory 70 to be maintained in substantially the same horizontal orientation with respect to the ground throughout pivoting movement of box 72 about axis 76. Thus, the leveling link 84 and the fixed link 82 cooperate with the remainder of the structure to maintain the accessory 70 in approximately the same horizontal orientation.

Because similar gate assemblies 130 are provided at opposite ends of the conveyor belt, it is possible to cause material to be discharged at either end of the conveyor belt merely by raising the desired gate and by reversing the rotational direction of motor 106. The V-shaped rib 114 of belt 112 and the V-shaped groove 110 of rollers 98, 100 helps make possible the ability to reverse the belt, and therefore provides an important function in the satisfactory operation of the device. A plurality of idler rollers 150 are provided to give support to the upper portion of belt 112 as shown in FIG. 6. Idler rollers 150 are provided with V-grooves 152 which are similar to grooves 110 in rollers 98,100, and which matingly receive rib 114 of conveyor belt 112.

Thus, it can be seen that the device accomplishes at least all of its stated objectives.

What is claimed is:

1. A dump truck accessory for a dump truck having a vehicle frame with forward and rearward ends, and a truck box having forward and rearward ends, said truck boxes and said vehicle frames being pivotally connected adjacent their rearward ends whereby said truck box can pivot about a horizontal truck box axis from a lowered position to an elevated position; said accessory comprising:

an accessory frame comprising forward and rearward channel frames spaced apart and parallel to one another and extending transversely of said vehicle, a plurality of spacer frames extending between said channel frames;

first and second conveyor rollers extending between said channels frames in spaced apart parallel relation to one another, said first and second rollers being rotatably mounted for rotation about roller axes extending in the direction of travel of said vehicle, each of said rollers having an outer cylindrical surface and annular groove in said cylindrical surface;

an endless conveyor belt trained around said conveyor rollers, said belt having forward and rearward edges and having an endless rib trained around said conveyor rollers and protruding within said annular grooves of said conveyor rollers, conveyor power means connected to said first conveyor roller for driving said first conveyor roller and said conveyor belt;

roller mounting means movably mounting said second conveyor roller to said accessory frame for adjustable movement toward and away from said first conveyor roller;

roller adjustment means connected to said roller mounting means for causing selective adjustable movement of said second conveyor roller relative to said first conveyor roller;

a forward attached to said forward channel frame and extending upwardly and forwardly therefrom;

a rearward wall attached to said rearward channel frame and extending upwardly and rearwardly therefrom;

first and second end gates spaced apart from one another and spanning the distance between said forward and rearward walls, each of said end gates having a lower edges and being movable from as lower position wherein said lower edge is closely adjacent said conveyor belt to an upper position wherein said lower edge is spaced upwardly from said conveyor belt;

first and second manually operable gate actuating means attached to said first and second gates respectively for causing said gates to move between said upper and lower positions;

an elongated front flashing member having an upper edge attached to said forward wall and having a lower edge resting on said conveyor belt on a line spaced inwardly from said forward edge of said conveyor belt, an elongated rear flashing member having an upper edge attached to said rearward wall and a lower edge resting on said conveyor belt on a line spaced inwardly from said rearward edge of said conveyor belt;

hinge means pivotally connecting said forward wall to said truck box for pivotal movement about a horizontal accessory axis located rearwardly of said truck box axis, leveling link means having a forward end pivotally connected to said truck frame for pivotal movement about a first horizontal link axis located below said truck box axis, and having a rearward end pivotally connected to said accessory frame for pivotal movement about a second link axis located below said accessory axis, whereby said leveling link will maintain said accessory frame in a substantially constant level orientation in response to pivotal movement of said truck box between said lowered and elevated positions;

flap extension means attached to said rearward end of said truck body and engaging said front wall to permit the contents of said truck box to be deposited on said conveyor with a minimum of spillage to the ground.

2. A dump truck accessory according to claim 1 wherein said annular grooves in said conveyor rollers are V-shaped in cross-section and said rib of said conveyor belt is V-shaped in cross-section.

3. A dump truck accessory according to claim 2 wherein said conveyor power means is reversible for permitting selective reversal of the rotational direction of said conveyor power means drives said first conveyor roller and said drive belt.

4. A dump truck accessory for a dump truck having a vehicle frame with forward and rearward ends, and a truck box having forward and rearward ends, said truck box and said vehicle frames being pivotally connected adjacent their rearward ends whereby said truck box can pivot about a horizontal truck box axis from a lowered position to an elevated position; said accessory comprising:

an accessory frame comprising forward and rearward channel frames spaced apart and parallel to one another and extending transversely of said vehicle, a plurality of spacer frames extending between said channel frames;

first and second conveyor rollers extending between said channel frames in spaced apart parallel relation to one another, said first and second rollers being rotatably mounted for rotation about roller axes extending in the direction of travel of said vehicle, each of said rollers having an outer cylindrical surface and annular groove in said cylindrical surface;

an endless conveyor belt trained around said conveyor rollers, said belt having forward and rearward edges and having an endless rib trained around said conveyor rollers and protruding within said annular grooves of said conveyor rollers, conveyor power means connected to said first conveyor roller for driving said first conveyor roller and said conveyor belt;

roller mounting means movably mounting said second conveyor roller to said accessory frame for adjustable movement toward and away from said first conveyor roller;

roller adjustment means connected to said roller mounting means for causing selective adjustable movement of said second conveyor roller relative to said first conveyor roller;

a forward wall attached to said forward channel frame and extending upwardly and forwardly therefrom;

a rearward wall attached to said rearward channel frame and extending upwardly and rearwardly therefrom;

first and second end gates spaced apart from one another and spanning the distance between said forward and rearward walls, each of said end gates having a lower edge and being movable from a lower position wherein said lower edge is closely adjacent said conveyor belt to an upper position wherein said lower edge is spaced upwardly from said conveyor belt;

first and second manually operable gate actuating means attached to said first and second gates respectively for causing said gates to move between said upper and lower positions;

an elongated front flashing member having an upper edge and having a lower flexible edge;

an elongated front retaining member detachably secured to said front wall and engaging said upper edge of said front flashing member to hold said front flashing member in retentive engagement with said front wall with said lower edge of said front flashing member engaging and being deflected against said conveyor belt on a line spaced inwardly from said forward edge thereof;

an elongated rear flashing member having an upper edge and a lower flexible edge;

an elongated rear retaining member detachably secured to said rear wall and engaging said upper edge of said rear flashing member to hold said rear flashing member in retentive engagement with said rear wall with said lower edge of said rear flashing engaging and being deflected against said conveyor belt on a line spaced rearwardly from said forward edge thereof;

hinge members pivotally connecting said forward wall to said truck box for pivotal movement about a horizontal accessory axis located rearwardly of said truck box axis, leveling link means having a forward end pivotally connected to said truck frame for pivotal movement about a first horizontal like axis located below said truck box axis, and having a rearward end pivotally connected to said accessory frame for pivotal movement about a second link axis located below said accessory axis, whereby said leveling link will maintain said accessory frame in a substantially constant level orientation in response to pivotal movement of said truck body between said lowered and elevated positions.

5. A dump truck accessory according to claim 4 comprising an elongated front channel attached to and extending along said upper edge of said front flashing member and being retentively engaged by said front retaining member, an elongated rear channel attached to and extending along said upper edge of said rear flashing member and being retentively engaged by said rear retaining member.

6. A dump truck assembly according to claim 5 wherein said front and rear channels are U-shaped in cross section and include spaced apart U-legs which retentively embraces the opposite sides of said upper edges of said front and rear flashing members respectively.

* * * * *